Patented June 19, 1951

2,557,091

UNITED STATES PATENT OFFICE 2,557,091

PLASTICIZED POLYVINYL CHLORIDE COMPOSITIONS

Harry R. Gamrath, St. Louis, and William E. Weesner, Webster Groves, Mo., assignors to Monsanto Chemical Company, St. Louis, Mo., a corporation of Delaware No Drawing. Application January 2, 1948, Serial No. 376

10 Claims. (Cl. 260—30.6)

This invention relates to improved plasticized resin compositions containing certain monoalkyl diaryl phosphate esters containing a chlorophenyl group and resins containing polymerized vinyl chloride. Resins containing polymerized vinyl chloride which are contemplated as being suitable for the purposes of this invention will be referred to broadly as "polyvinyl chloride resins" with the intention that "polyvinyl chloride resins" include polymerized vinyl chloride (polyvinyl chloride), copolymers of vinyl chloride and compositions containing both polymerized vinyl chloride and vinyl chloride copolymers.

Heretofore, resins such as polyvinyl chloride or copolymer resins such as polyvinyl chlorideacetate, which are normally rigid and brittle in their unplasticized state, have been commonly plasticized with compounds such as dioctyl phthalate, dibutyl sebacate and tricresyl phosphate, and films and sheets formed therefrom possess, in addition to other desirable properties, a durability and flexibility affording them extensive utility as materials for the fabrication of shoes, handbags, seat and cushion coverings, shower curtains and coated fabrics. For many of these uses, it has become necessary and highly desirable that a single plasticizer when incorporated with a polyvinyl chloride resin will produce a plastic composition which will possess the three essential characteristics of low-temperature flexibility, low volatility losses of the plasticizer and non-inflammability, whereas the plasticized compositions known and used up to the present time have been deficient in at least one of these three essential characteristics. In practical use, these articles of manufacture are oftentimes subjected to the freezing temperatures of winter weather and it is necessary that these sheets and films retain their flexibility characteristics at these temperatures. While compositions plasticized with dioctyl phthalate and dibutyl sebacate retain their flexibility at low temperatures, these plasticizers have the undesirable quality of being inflammable. In addition, dibutyl sebacate is unsatisfactory as a plasticizer for polyvinyl chloride resin compositions because of its high volatility. On the other hand, when tricresyl phosphate, which is a very good plasticizer from the standpoint of low volatility and non-inflammability, is used to plasticize polyvinyl chloride resins the compositions rapidly lose their flexibility at cooler temperatures and become stiff and hard at freezing temperatures. Although the low-temperature flexibility characteristics of compounds plasticized with tricresyl phosphate are improved to some extent by the use of a secondary plasticizer such as dibutyl phthalate, the compositions are unsatisfactory for many uses because of the high volatility and the inflammability of the dibutyl phthalate. The use of triphenyl phosphate as a plasticizer for polyvinyl chloride resins is not desirable for the reason that triphenyl phosphate is incompatible with polyvinyl chloride resins and a secondary plasticizer must be employed to facilitate compatibility. While trioctyl phosphate is also useful as a plasticizer for polyvinyl chloride resins, the high volatility of trioctyl phosphate is objectionable.

In view of this state of the art it has become highly desirable that a plasticizer be discovered for polyvinyl chloride resin compositions which would not only insure good low-temperature flexibility characteristics but would also insure retention of the plasticizer at higher temperatures, and in addition, inasmuch as polyvinyl chloride resin compositions are being developed for coatings for textiles to be fabricated into clothing, drapes and furniture coverings, as a safety precaution and a fire prevention measure, it is most desirable that the plasticized compositions be non-inflammable. It is most desirable to have a plasticizer which when in combination with polyvinyl chloride resins will produce compositions having the combination of properties of low-temperature flexibility, low volatility losses and non-inflammability.

It is an object of this invention to provide improved and novel polyvinyl chloride resin compositions. A further object is to provide novel plasticized compositions comprising polyvinyl chloride resins and certain monoalkyl diaryl phosphate esters containing a chlorophenyl group. A still further object is to provide plasticized polymerized vinyl chloride resin compositions wherein a single plasticizer, when in combination with the polyvinyl chloride resin, produces compositions having at least the three highly desirable characteristics of low-temperature flexibility, low volatility losses of plasticizer and non-inflammability. Further objects will be apparent to those skilled in the art from the following description and claims.

According to the present invention, generally stated, when polymerized vinyl resins, particularly polymerized vinyl chloride and vinyl chloride polymers, are plasticized with monoalkyl diaryl phosphate esters containing a chlorophenyl group, which esters may be represented by the type formula

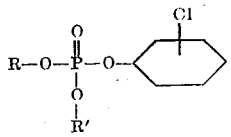

wherein R represents an alkyl group containing at least 6 and not more than 12 carbon atoms or an alkoxyethyl group wherein the alkyl substituent contains at least 4 and not more than 12 carbon atoms, and R' represents a phenyl, cresyl, or chlorophenyl group, new compositions are formed which possess a group of desirable properties not heretofore obtainable with the formerly used plasticizers. Herein, when the phrase "monoalkyl diaryl phosphate esters containing a chlorophenyl group" is used, it is the intention that the phrase include only such compounds as fall within the above definition.

According to one embodiment of this invention, plastic compositions may be prepared comprising a monoalkyl diaryl phosphate ester containing a chlorophenyl group and any vinyl halide polymer or vinyl halide copolymer which is normally valued for its elastomeric properties when plasticized. Vinyl halide polymers and copolymers which are most commonly known are those containing vinyl chloride although the monoalkyl diaryl phosphates containing a chlorophenyl group as are described in this invention may equally well be used to form plastic compositions from other vinyl halides such as vinyl fluoride polymers and copolymers. Polymerized or copolymerized vinyl chloride resin compositions, which are known to those skilled in the art as being elastomeric when plasticized and are valued for their many desirable and useful characteristics, are illustrated by polyvinyl chloride, polyvinyl chloride-acetate, and copolymers of polyvinyl chloride with methyl methacrylate, diethyl maleate or vinylidene chloride. According to another embodiment of this invention, when polyvinyl chloride resins, particularly polyvinyl chloride and polyvinyl chloride copolymers, are plasticized with the herein described monoalkyl diaryl phosphates containing chlorophenyl groups, compositions result which exhibit the desirable combination of excellent low-temperature flexibility characteristics, low volatility losses of plasticizer and non-inflammability.

Monoethyl diphenyl phosphate and monoethyl diphenyl phosphates have been disclosed in the art as plasticizers for cellulose esters. However, when it was attempted to use these esters with polyvinyl chloride or copolymers of polyvinyl chloride, the esters decomposed at the working temperatures of the roll mills and, therefore, there was no indication of the utility of this type of phosphate ester as a plasticizer for polyvinyl chloride resins or copolymer resins of polyvinyl chloride.

While, according to this invention, plastic compositions may be prepared from various polyvinyl chloride resins and the monoalkyl diaryl phosphates containing a chlorophenyl group as hereinbefore described, the invention is particularly applicable to compositions containing polyvinyl chloride and copolymers of polyvinyl chloride such as polyvinyl chloride-acetate and polyvinyl chloride-vinylidene chloride. While the properties of individual compounds as plasticizers in specific compositions will be shown in examples appearing hereinafter, the plasticizers of this invention are illustrated by the following compounds, although it is not intended that this invention be limited to the following compounds:

Butoxyethyl di(o-chlorophenyl) phosphate
Butoxyethyl phenyl o-chlorophenyl phosphate
Butoxyethyl cresyl o-chlorophenyl phosphate
n-Hexyl phenyl p-chlorophenyl phosphate
2-ethylbutyl phenyl p-chlorophenyl phosphate
2-methylpentyl di(o-chlorophenyl) phosphate
2-methylpentoxyethyl cresyl o-chlorophenyl phosphate
2-ethylbutoxyethyl phenyl o-chlorophenyl phosphate
n-Octyl di(o-chlorophenyl) phosphate
2-ethylhexyl di(o-chlorophenyl) phosphate
2-ethylhexyl cresyl o-chlorophenyl phosphate
2-ethylhexyl phenyl p-chlorophenyl phosphate
2-ethylhexoxyethyl cresyl o-chlorophenyl phosphate
Nonyl cresyl o-chlorophenyl phosphate
Trimethylhexyl phenyl p-chlorophenyl phosphate
2-n-propylheptyl di(o-chlorophenyl) phosphate
2-n-propylheptoxyethyl phenyl o-chlorophenyl phosphate
Decoxyethyl cresyl o-chlorophenyl phosphate
Decyl phenyl p-chlorophenyl phosphate
Dodecyl di(o-chlorophenyl) phosphate
Dodecoxyethyl phenyl p-chlorophenyl phosphate
Dodecyl cresyl o-chlorophenyl phosphate In the above examples, the alkyl radicals may be derived, in addition to the conventional sources, from the alcohols manufactured from the polymerization products of olefins.

Suitable plasticizers for the purposes of this invention are those mixtures of monoalkyl diaryl phosphates containing a chlorophenyl group wherein the alkyl residues are obtained from a mixture of monohydric alcohols derived from cocoanut oil of which substantially 60% of the alkyl radicals contain at least 8 and not more than 12 carbon atoms.

*Butoxyethyl di(o-chlorophenyl) phosphate*

153.4 g. (1.0 mol) of POCl₃ are cooled with stirring to about 15° C. in a glass lined closed reaction vessel. 118 g. (1.0 mol) of anhydrous ethylene glycol monobutyl ether which has been cooled to approximately 15° C. is added to the POCl₃ with continuous stirring and at a rate so as to maintain a reaction temperature of about 15° C. The reaction mixture is agitated and by means of continuous stirring the reaction temperature of 15° C. is maintained for one hour following the addition of all of the ethylene glycol monobutyl ether, thereafter the temperature is allowed to rise to 25° C. and the stirring continued for another hour while the hydrogen chloride gas which is evolved from the reaction is continuously removed by means of applying a vacuum of 25 mm. Hg to the reaction vessel. The reaction product is butoxyethyl phosphoryl dichloride.

A sodium o-chlorophenate was prepared by adding 282.3 g. (2.1 mols) of o-chlorophenol (95.6%) to an aqueous alkaline solution prepared by dissolving 175.6 g. of 48% sodium hydroxide in 280 cc. of water. This solution of sodium o-chlorophenate is cooled to 3° C. and with continuous cooling 230.7 g. of the butoxyethyl phosphoryl dichloride are added to the sodium o-chlorophenate solution at such a rate as to maintain a reaction temperature below 5° C. After all of the butoxyethyl phosphoryl dichloride has been added to the sodium o-chlorophenate solution, the reaction mixture is agitated for an additional hour and then, with continuous stirring, allowed to warm up to room temperature. The mixture is then allowed to stand until an ester layer of butoxyethyl di(o-chlorophenyl) phosphate and an aqueous layer form and the crude ester layer is then separated from the aqueous layer by decantation. The crude ester is given successive washes with 2% sodium hydroxide solution and water thereby removing the unreacted chlorophenol and partial esters, and reducing the alkalinity of the mass until it is acid to phenolphthalein and then further refined in accordance with the usual methods well known to those skilled in the art of refining phosphate esters. The yield, based on POCl₃, was 80.7%.

The butoxyethyl di(o-chlorophenyl) phosphate prepared in the above manner had the following properties:

Sp. gr. 25/25° C. _____ 1.257
$N_D^{25}$ _____ 1.525

*Butoxyethyl phenyl o-chlorophenyl phosphate*

An aqueous solution of sodium phenate and sodium o-chlorophenate was prepared by adding 141.2 g. (1.05 mols) of o-chlorophenol (95.6%) and 98.7 g. (1.05 mols) of phenol to 280 cc. of water into which 175.6 g. of 48% sodium hydroxide had been dissolved. This aqueous solution of sodium phenate and sodium o-chlorophenate was cooled to about 0° C. and while the cooling was continued 230.7 g. of butoxyethyl phosphoryl dichloride, prepared as described in the previous example, were added with stirring to the mixture of sodium o-chlorophenate and sodium phenate at such a rate so as to maintain a reaction temperature below 5° C. The addition of the butoxyethyl phosphoryl dichloride requires about 1½ hours, and thereafter the reaction temperature is maintained at about 5° C. for an additional one-half hour. The mixture was then allowed to warm up to 26° C. during a three-hour period while the stirring was continued. Thereafter the butoxyethyl phenyl o-chlorophenyl phosphate was recovered and purified in the manner as described in the previous example. The yield of butoxyethyl phenyl o-chlorophenyl phosphate, based on POCl₃, was 85.4% and this ester as above prepared had the following properties:

Sp. gr. 25/25° C. _____ 1.212
$N_D^{25}$ _____ 1.5196

*2-ethylhexyl cresyl o-chlorophenyl phosphate*

153.4 g. of POCl₃ are cooled with stirring to about 10° C. in a glass lined closed reaction vessel. 130.2 g. of 2-ethylhexanol are cooled to about 10° C. and added to the POCl₃ with continuous stirring and at a rate so as to maintain a reaction temperature of 10–14° C. The reaction mixture is continuously agitated and the temperature is gradually increased to 25° C. over a period of about one hour. While the stirring is continued the reaction mixture is placed under a vacuum (below 50 mm.) for another 1½ hours to remove the hydrogen chloride gas which is evolved from the reaction. The product of the above reaction is 2-ethylhexyl phosphoryl dichloride.

113.5 g. (1.05 mols) of cresol and 142.2 g. (1.05 mols) of 95.6% o-chlorophenol were reacted with an aqueous sodium hydroxide solution prepared by dissolving 168.6 g. of 49.8% sodium hydroxide into 280 cc. of water. This aqueous solution of sodium cresylate and sodium o-chlorophenate was cooled to 0° C. and while the cooling was continued 245.3 g. of the above prepared 2-ethylhexyl phosphoryl dichloride were added at such a rate so that a reaction temperature below 5° C. could be maintained. After all of the 2-ethylhexyl phosphoryl dichloride had been added to the solution of sodium cresylate and sodium o-chlorophenate, the reaction mixture was agitated for an additional hour and then, with continuous stirring, allowed to warm up to room temperature. Thereafter the mixture was allowed to stand until an ester layer and an aqueous layer had formed and the crude ester layer was then separated from the aqueous layer by decantation. The crude ester was given successive washes with 2% soda lye solution and water thereby removing the unreacted phenols and partial esters, and reducing the alkalinity of the mass until it was acid to phenolphthalein, and then further refined in accordance with the usual methods well known to those skilled in the art of refining phosphate esters. The yield of 2-ethylhexyl cresyl o-chlorophenyl phosphate, based on POCl₃, was 93.3% and this ester had the following properties:

Sp. gr. 25/25° C _____ 1.141
$N_D^{25}$ _____ 1.5155

*2-ethylhexoxyethyl cresyl o-chlorophenyl phosphate*

153.4 g. (1.0 mol) of POCl₃ were cooled with stirring to about 15° C. in a glass lined closed reaction vessel. 174.0 g. (1.0 mol) of ethylene glycol mono-2-ethylhexyl ether were cooled to about 15° C. and added to the POCl₃ with continuous stirring and cooling and at a rate so as to maintain a reaction temperature of 15° C. The reaction mixture is agitated and the reaction temperature of 15° C. is maintained for one hour following the addition of all of the ethylene glycol mono-2-ethylhexyl ether. Thereafter the reactor was placed under a vacuum of 27 mm. Hg to remove the hydrogen chloride gas which is formed during the reaction and the temperature was allowed to rise to approximately 25° C. while the stirring was continued for another hour. The product of this reaction was 2-ethylhexoxyethyl phosphoryl dichloride.

168.6 g. of 49.8% sodium hydroxide solution were added to a mixture of 113.5 g. (1.05 mols) of cresol, 142.2 g. (1.05 mols) of 95.6% o-chlorophenol and 280 cc. of water to form an aqueous solution of sodium cresylate and sodium o-chlorophenate. This solution is then cooled to about 0° C. and while the cooling is continued 291.1 g. (1.0 mol) of the above prepared 2-ethylhexoxyethyl phosphoryl dichloride were added to the cooled solution of sodium cresylate and sodium o-chlorophenate with stirring and at a rate so as to maintain a reaction temperature below 5° C. Thereafter while the stirring and cooling were continued the reaction temperature was held at about 5° C. for one hour, and then with continuous stirring the temperature was gradually raised to 25° C. Upon stopping the agitation the crude ester was separated from the reaction mixture by decantation and further purified in the manner as was described in the previous example. The 2-ethylhexoxyethyl cresyl o-chlorophenyl phosphate as above prepared was recovered in a yield of 88.8%, based on POCl₃, and the ester had the following properties:

Sp. gr. 25/25° C. _____ 1.142
$N_D^{25}$ _____ 1.5100

Dodecyl di(o-chlorophenyl) phosphate 139.5 g. of dodecyl alcohol were cooled with stirring to about 20° C. in a glass lined closed reaction vessel. 115.1 g. of $POCl_3$ were cooled to approximately 20° C. and added to the $POCl_3$ with continuous stirring and at a rate so as to maintain a reaction temperature of 20° C. The reaction mixture was agitated and the temperature was slowly raised to 30 to 40° C. and maintained at that temperature for one hour following the addition of all the dodecyl alcohol; thereafter the temperature was raised to approximately 50° C. and the stirring continued for another hour while the remaining hydrogen chloride gas which was evolved from the reaction was removed by means of applying a vacuum of 75 mm. Hg to the reaction vessel. The product of the above reaction was dodecyl phosphoryl dichloride.

126.4 g. of 49.8% sodium hydroxide solution were added to a mixture of 213.5 g. (1.58 mols) of 95.6% o-chlorophenol and 210 cc. of water to form an aqueous solution of sodium o-chlorophenate. This solution was stirred and cooled to about 5° C. and while the cooling and stirring was continued, the above prepared dodecyl phosphoryl dichloride was slowly added to the cooled solution of sodium o-chlorophenate at a rate so that the reaction temperature below 5° C. could be maintained. After all the dodecyl phosphoryl dichloride has been added to the sodium chlorophenate solution, the reaction mixture is agitated for an hour and then with continuous stirring the temperature is gradually raised to 30° C. The reaction mixture is then allowed to stand until an ester layer and an aqueous layer form and the crude ester layer is separated from the aqueous layer by decantation. The crude ester is given successive washes with 2% NaOH solution and water thereby removing the unreacted chlorophenol and partial esters, and reducing the alkalinity of the mass until it is acid to phenolphthalein, and then further refined in accordance with the usual methods well known to those skilled in the art of refining phosphate esters. The yield of dodecyl di(o-chlorophenyl) phosphate, based on $POCl_3$, was 88%.

Dodecoxyethyl phenyl p-chlorophenyl phosphate

To 200 g. of $POCl_3$, cooled to about 20° C. in a closed and continuously cooled reactor, 300 g. of ethylene glycol monododecyl ether were added with stirring and at a rate so as to maintain a reaction temperature of about 20° C. After all of the ethylene glycol monododecyl ether had been added to the $POCl_3$, the reaction temperature was slowly raised to and maintained at 30 to 40° C. for about one hour while the stirring was continued. Thereafter, the temperature was raised to 50° C. and maintained at that temperature for an additional hour while the stirring was continued and a vacuum of 25 mm. Hg was applied to the reactor to remove the hydrogen chloride formed during the reaction. At this point, the reaction product remaining in the reactor is dodecoxyethyl phosphoryl dichloride.

An aqueous solution of a mixture of sodium phenate and sodium p-chlorophenate was prepared reacting 129.0 g. of chlorophenol and 176.2 g. of p-chlorophenol with 650 g. of an aqueous caustic solution containing 109.4 g. of NaOH was cooled to 5° C. and while the cooling of the aqueous phenate solution was continued, the above prepared dodecoxyethyl phosphoryl dichloride was slowly added to the cooled solution of sodium phenates with stirring and at a rate so as to maintain a reaction temperature of about 5° C. Thereafter, the temperature was slowly raised to 30° C. and the stirring continued for another hour, at which time the reaction was finished with the formation of dodecoxyethyl phenyl p-chlorophenyl phosphate, which was recovered and purified in the manner described in the previous example. The yield, based on $POCl_3$, was 85%.

The plastic compositions comprising the polyvinyl resins and the monoalkyl diaryl phosphate plasticizers of this invention may be prepared by incorporating the plasticizer with the polyvinyl resin to the extent of 20 to 60% of the weight of the finished composition. When the plasticizer content is below the lower limit of 20%, the flexibility characteristics of the composition are seriously impaired, whereas a plasticizer content above 60% approaches the upper limit of utility. However, we have found that a plasticizer content of 25 to 50% and preferably 30 to 45% of the monoalkyl diaryl phosphate containing a chlorophenyl group is desirable for most applications.

The plasticizer may be incorporated into the composition comprising the polyvinyl resin and the monoalkyl diaryl phosphate on a two-roll differential speed mill with a roll temperature of between 100 and 170° C., although a temperature of 120 to 140° C. was found to be quite satisfactory. The preferable rolling conditions for sheets are accomplished when the "hot" roll is maintained at 100–170° C. and the other roll is maintained at a temperature 15 to 20° C. below the temperature of the "hot" roll. Other means of mixing or kneading are well known and may be used provided a composition temperature is maintained between 100 and 170° C.

For purposes of comparison and indicating the outstanding results to be obtained by the use of the plasticizers described in this invention, the following table is presented showing the characteristics of polyvinyl chloride plasticized with the commonly used plasticizers in the amount of 40% of the total weight of the composition:

|  | Low Temp. Flexibility Point | Volatility, Per Cent Loss | Inflammability |
|---|---|---|---|
|  | ° C. |  |  |
| Dioctyl phthalate | −38 | 4.5 | .125 sq. cm./sec. |
| Dibutyl sebacate | −70 | 54.6 | Inflammable. |
| Tricresyl phosphate | −13 | 0.7 | Non-inflam. |
| Tri(o-chlorophenyl) phosphate | +4 | 1.2 | Non-inflam. |

The following methods, which are well known to those persons skilled in the art of plasticizing resinous compositions, were used in testing all of the plastic compositions described:

The low temperature flexibility points, by the method described by Clash and Berg, Ind. Eng. Chem., 34, 1218 (1942). Volatility, samples containing 40% by weight of plasticizers were exposed for 24 hours at 105° C. in a Freas circulating oven, and the loss in weight was calculated as per cent loss of plasticizer. Inflammability, in accordance with ASTM D568–43, method B. Herein, throughout the specification and claims, the use of the term "non-inflammable" means that the plasticized composition did not, or will not, ignite when tested in accordance with ASTM D568–43, method B.

The following examples illustrate the advantageous and unexpected results to be achieved by the use of the monoalkyl diaryl phosphates containing a chlorophenyl group of the present invention in polyvinyl resin compositions, but it is not intended that this invention be limited by or to the examples:

*Example I*

The following tabulation shows the low temperature flexibility points, volatility losses and inflammabilities of a series of plasticized polyvinyl chloride compositions prepared by intimately mixing 60 parts by weight of granular polyvinyl chloride with 39 parts by weight of the indicated monoalkyl diaryl phosphate ester containing a chlorophenyl group plasticizer and one part by weight of basic lead silicate, a basic heat stabilizer, and working the mixture on a differential speed roll-mill with the "hot" roll at a temperature of 140° C. until homogeneous compositions had been formed. A sheet of each milled plasticized composition was cut from the roll mill, and after cooling, a portion of each sheet was placed in a mold in a hydraulic press at a temperature of 325° F. and 2,000 pounds per square inch pressure for 5 minutes and molded into sheets of 0.040 inch thickness. Upon removing the molded plasticized polyvinyl chloride composition sheets from the press, the molded sheets were evaluated in accordance with the tests hereinbefore described, and the following tabulated results were observed:

| Plasticizer, a Monoalkyl Diaryl Phosphate Ester Containing a Chlorophenyl Group | Properties of the Plasticized Polyvinyl Chloride Compositions | | |
|---|---|---|---|
| | Low Temperature Flex. Point °C. | Volatility, Per Cent Loss | Inflammability |
| Butoxyethyl di(o-chlorophenyl) phosphate | −19.5 | 1.73 | Non-inflam. |
| Butoxyethyl phenyl o-chlorophenyl phosphate | −23 | 2.60 | Non-inflam. |
| Butoxyethyl cresyl o-chlorophenyl phosphate | −22 | 1.65 | Non-inflam. |
| 2-Ethylhexyl di(o-chlorophenyl) phosphate | −22.5 | 1.97 | Non-inflam. |
| 2-Ethylhexyl cresyl o-chlorophenyl phosphate | −25 | 1.79 | Non-inflam. |
| 2-Ethylhexoxyethyl cresyl p-chlorophenyl phosphate | −30 | 1.0 | Non-inflam. |
| 2-Ethylhexoxyethyl cresyl o-chlorophenyl phosphate | −22.5 | 0.77 | Non-inflam. |
| Dodecyl di(o-chlorophenyl) phosphate | −27 | 1.1 | Non-inflam. |
| Dodecoxyethyl phenyl p-chlorophenyl phosphate | −30 | 0.75 | Non-inflam. |

All of the above compositions of polyvinyl chloride plasticized with a monoalkyl diaryl phosphate ester containing a chlorophenyl group evidence the desirable combination of low-temperature flexibility, low volatility of the plasticizer at increased temperatures and flameproofing.

*Example II*

70 parts by weight of a copolymer of vinyl chloride and vinyl acetate (combined vinyl chloride approximately 94%) were intimately mixed with 30 parts by weight of 2-methylpentyl di(o-chlorophenyl) phosphate plasticizer, and this mixture was worked on a differential speed roll mill at a temperature of 140° C. until a homogeneous composition had been formed. A portion of this milled composition was molded to form a sheet of 40 mil thickness, and this molded sheet was non-inflammable, had a low-temperature flexibility point of about −20° C. and evidenced a volatility loss of about 1.8%.

*Example III*

A mixture of 50 parts by weight of 2-n-propylheptyl di(o-chlorophenyl) phosphate per 100 parts by weight of a copolymer resin of vinyl chloride and vinylidene chloride (combined vinyl chloride approximately 92% by weight) was milled and fluxed in a roll mill wherein the hot roll was maintained at 135° C. until a homogeneous composition had been formed, and the composition was then sheeted off of the roll. A 40 mil molded sheet of this composition was non-inflammable, had a low-temperature flexibility point of about −25° C. and a volatility loss of 1.5%.

*Example IV*

A plasticized composition was prepared by milling at 140° C. on a two-roll differential speed roll-mill, a mixture of 45 parts by weight of octyl phenyl p-chlorophenyl phosphate ester plasticizer and 55 parts by weight of a copolymer resin of vinyl chloride and vinyl acetate (combined vinyl chloride approximately 94%) to form a homogeneous fluxed composition.

A portion of this milled plasticized composition, molded into a sheet of 40 mil thickness, was non-inflammable, had a low-temperature flexibility point below −30° C., and had a volatility loss of about 2%.

These examples show further that when copolymers of vinyl chloride are plasticized with the plasticizer of this invention, the monoalkyl diaryl phosphate esters containing a chlorophenyl group, plasticized compositions are formed which possess the highly desirable combination of properties of low-temperature flexibility, low volatility losses of the plasticizer at elevated temperatures and non-inflammability. As stated hereinbefore, other copolymers containing predominantly vinyl chloride may be plasticized with the plasticizers of this invention, the monoalkyl diaryl phosphates containing a chlorophenyl group, and illustrative examples of such copolymers are the copolymers of 95 to 85% by weight of vinyl chloride and 5 to 15% by weight of vinylidene chloride, diethylmaleate or methyl methacrylate.

The monoalkyl diaryl phosphate esters containing a chlorophenyl group herein described may be used in the preparation of organosols containing polyvinyl chloride resins, and the ordinary solvents, diluents and swelling agents which are well known to the art. Using the monoalkyl diaryl phosphate esters containing a chlorophenyl group, it is possible to prepare polyvinyl chloride organosols of very high solids content and with a wide range of viscosities ranging from thin mobile liquids to heavy pastes. These polyvinyl organo solids are extensively used in the casting of free films and the coating of paper and fabrics with plasticized polyvinyl chloride films.

The monoalkyl diaryl phosphate esters, utilized as plasticizers in the novel compositions of this invention, are claimed as compounds per se in copending application Serial No. 84,762, filed March 31, 1949, as a division of this application. The process for the preparation of the monoalkyl diaryl phosphate esters utilized as plasticizers in the novel compositions of this invention is claimed in copending application Serial No. 75,098, filed February 7, 1949, now Patent Number 2,504,121, which is a continuation-in-part of application Serial No. 38,194, filed July 12, 1948, now abandoned, which was a continuation-inpart of application Serial No. 720,310, filed January 4, 1947, now abandoned.

We claim:

1. A plasticized polyvinyl chloride composition comprising a polyvinyl chloride resin selected from the group consisting of polyvinyl chloride and copolymers of vinyl chloride and unsaturated materials copolymerizable therewith, and 20 to 60% by weight of monoalkyl diaryl phosphate esters having the formula:

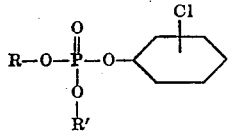

wherein R is selected from the group consisting of alkyl radicals containing at least 6 and not more than 12 carbon atoms and alkoxy ethyl radicals wherein the alkyl substituent contains at least 4 and not more than 12 carbon atoms, and R' is a radical selected from the group consisting of phenyl, cresyl and chlorophenyl.

2. A sheet of plasticized polyvinyl chloride composition comprising a polyvinyl chloride resin selected from the group consisting of polyvinyl chloride and copolymers of vinyl chloride and unsaturated materials copolymerizable therewith, and containing 30 to 45% by weight of monoalkyl diaryl phosphate esters having the formula:

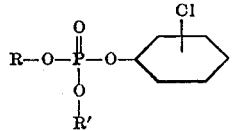

wherein R is selected from the group consisting of alkyl radicals containing at least 6 and not more than 12 carbon atoms and alkoxy ethyl radicals wherein the alkyl substituent contains at least 4 and not more than 12 carbon atoms, and R' is a radical selected from the group consisting of phenyl, cresyl and chlorophenyl.

3. A plasticized polyvinyl chloride composition comprising a polyvinyl chloride resin selected from the group consisting of polyvinyl chloride and copolymers of vinyl chloride and unsaturated materials copolymerizable therewith, and containing 20 to 60% by weight of monoalkyl diaryl phosphate esters having the formula:

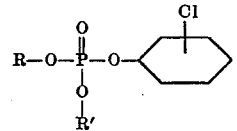

wherein R represents an alkyl radical containing at least 6 and not more than 12 carbon atoms, and R' represents a radical selected from the group consisting of phenyl, cresyl and chlorophenyl.

4. A plasticized composition comprising polyvinyl chloride and 20 to 60% by weight of monoalkyl diaryl phosphate esters having the formula:

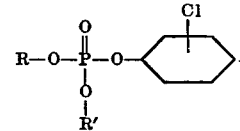

wherein R represents an alkyl radical containing at least 6 and not more than 12 carbon atoms and R' represents a radical selected from the group consisting of phenyl, cresyl and chlorophenyl.

5. A plasticized composition comprising polyvinyl chloride and 30 to 45% by weight of monoalkyl diaryl phosphate esters having the formula:

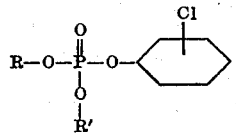

wherein R represents an alkyl radical containing at least 6 and not more than 12 carbon atoms and R' represents a radical selected from the group consisting of phenyl, cresyl and chlorophenyl.

6. A plasticized polyvinyl chloride composition comprising a polyvinyl chloride resin selected from the group consisting of polyvinyl chloride and copolymers of vinyl chloride and unsaturated materials copolymerizable therewith, and containing 20 to 60% by weight of an octyl diaryl phosphate ester having the formula:

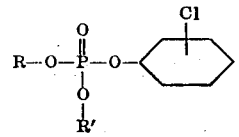

wherein R represents an 8 carbon alkyl radical and R' represents a radical selected from the group consisting of phenyl, cresyl and chlorophenyl.

7. A plasticized composition comprising polyvinyl chloride and 20 to 60% by weight of an octyl diaryl phosphate ester having the formula:

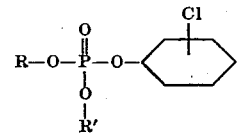

wherein R represents an 8 carbon alkyl radical and R' represents a radical selected from the group consisting of phenyl, cresyl and chlorophenyl.

8. A plasticized composition comprising polyvinyl chloride and 30 to 45% of 2-ethylhexyl di(chlorophenyl) phosphate.

9. A plasticized composition comprising polyvinyl chloride and 30 to 45% of 2-ethylhexyl phenyl chlorophenyl phosphate.

10. A plasticized composition comprising polyvinyl chloride and 30 to 45% of butoxyethyl di(chlorophenyl) phosphate.

HARRY R. GAMRATH.
WILLIAM E. WEESNER.

REFERENCES CITED

The following references are of record in the file of this patent:

UNITED STATES PATENTS

| Number | Name | Date |
|---|---|---|
| 2,223,329 | Moyle | Nov. 26, 1940 |
| 2,385,879 | Patton | Oct. 2, 1945 |
| 2,406,802 | Carruthers | Sept. 3, 1946 |